United States Patent
Chang et al.

(10) Patent No.: US 9,239,230 B2
(45) Date of Patent: Jan. 19, 2016

(54) COMPUTING DEVICE AND METHOD FOR MEASURING WIDTHS OF MEASURED PARTS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Li Jiang, Shenzhen (CN); Zhong-Kui Yuan, Shenzhen (CN); Zhi-Jun Zou, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 472 days.

(21) Appl. No.: 13/717,845

(22) Filed: Dec. 18, 2012

(65) Prior Publication Data

US 2013/0169791 A1    Jul. 4, 2013

(30) Foreign Application Priority Data

Dec. 30, 2011   (CN) .......................... 2011 1 0453373

(51) Int. Cl.
*G01B 11/03*        (2006.01)

(52) U.S. Cl.
CPC ..................... *G01B 11/03* (2013.01)

(58) Field of Classification Search
CPC ....... G01B 11/03; F16B 19/06; F16B 39/282; F16B 5/00
See application file for complete search history.

(56) References Cited

U.S. PATENT DOCUMENTS

| | | | | |
|---|---|---|---|---|
| 5,523,553 | A * | 6/1996 | Kusaka et al. | 250/201.8 |
| 7,821,652 | B2 * | 10/2010 | Chang et al. | 356/624 |
| 8,607,466 | B2 * | 12/2013 | Pettersson et al. | 33/503 |
| 2002/0056808 | A1 * | 5/2002 | Tsuneta et al. | 250/306 |
| 2010/0302366 | A1 * | 12/2010 | Zhao et al. | 348/142 |

* cited by examiner

*Primary Examiner* — Christopher S Kelley
*Assistant Examiner* — Deirdre Beasley
(74) *Attorney, Agent, or Firm* — Novak Druce Connolly Bove + Quigg LLP

(57) ABSTRACT

In a method to measure widths of measured parts placed on a platform, a computing device connects to one or more charge coupled device (CCD) cameras. The method controls each of the CCD cameras to capture a digital image from a measured part that is placed near the CCD cameras, obtains the digital image of the measured part from each of the CCD cameras in a predefined order, and obtains a binary expression from the digital image of the measured part. When the measured part is placed in a correct position on the platform, the method further obtains three points from an upper boundary of the measured part in the binary expression and another three points from a lower boundary of the measured part in the binary expression, and calculates width of the measured part according to the obtained six points.

15 Claims, 5 Drawing Sheets

COMPUTING DEVICE AND METHOD FOR MEASURING WIDTHS OF MEASURED PARTS

BACKGROUND

1. Technical Field

Embodiments of the present disclosure relate to data measurement systems and methods, and particularly to a computing device and method for measuring widths of measured parts using the computing device.

2. Description of Related Art

Measurement is an important phase in manufacturing and is closely related to product quality. If a plurality of measured parts (e.g. a narrow gauge) of an object is measured, a high precision measurement apparatus is used to measure a width of each of the measured parts one by one. However, the measurement apparatus is expensive, and measurement of the measured parts one by one adversely affects efficiency. Therefore, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. The non-transitory computer-readable storage medium may include CDs, DVDs, BLU-RAY, flash memory, and hard disk drives.

Figure 1:
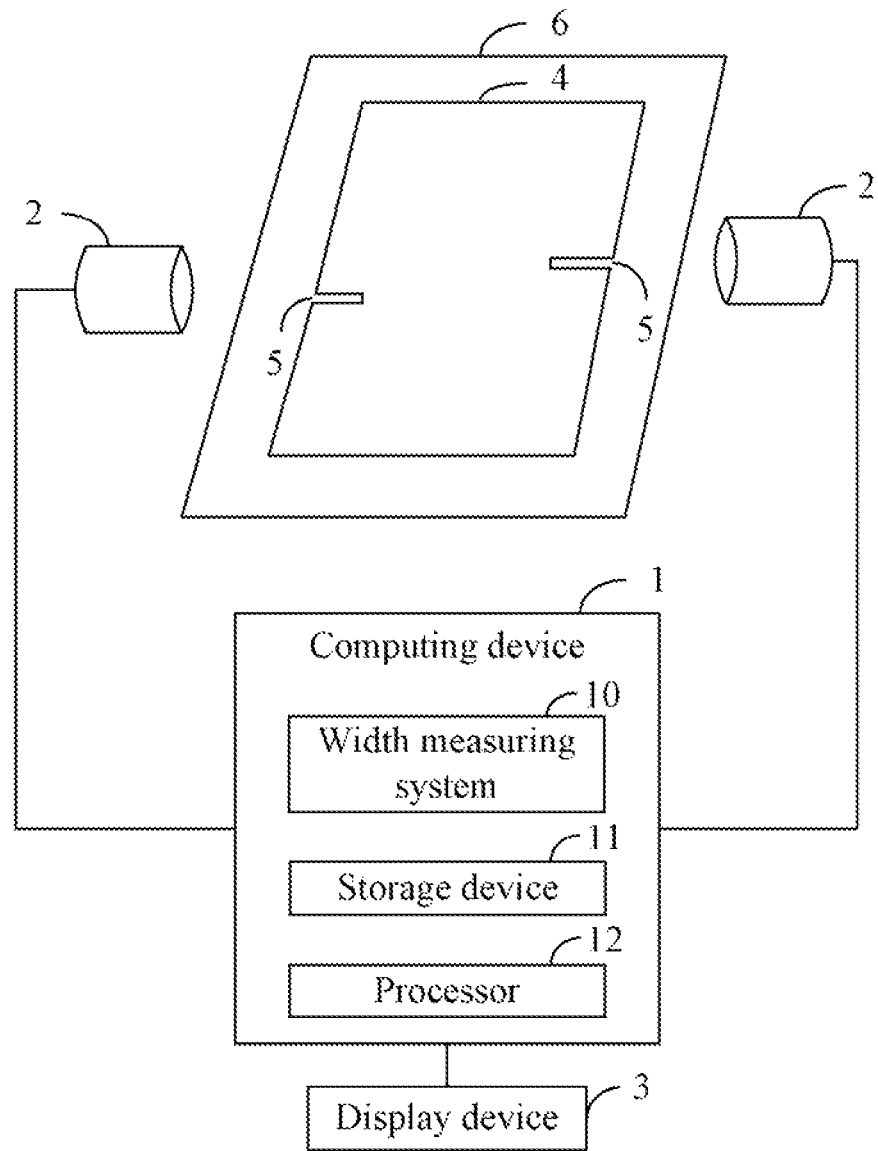
FIG. 1 is a block diagram of one embodiment of a computing device including a width measuring system.

FIG. 1 is a block diagram of one embodiment of a computing device 1 including a width measuring system 10. In the embodiment, the computing device 1 is electronically connected to at least one charge coupled device (CCD) camera 2 and a display device 3. Referring to FIG. 1, only two CCD cameras 2 are connected to the computing device 1. Each of the CCD cameras 2 captures digital images of one or more measured parts 5 of an object 4. Each of the measured parts 5 can be a narrow element (e.g. a narrow gauge) of the object 4, such as a thin convex part or a narrow concave part of the object 4, for example.

In one embodiment, the object 4 is placed on a platform 6, the object 4 comprising a plurality of measured parts 5 (only two measured parts 5 shown in FIG. 1). A CCD camera 2 is placed next to each of the measured parts 5, where the CCD camera 2 is at a right angle to the platform 6. Each of the measured parts 5 is within the lens field of a CCD camera 2. An edge of each of the measured parts 5 coincides with an edge of the object 4.

The width measuring system 10 controls each of the CCD cameras 2 to capture a digital image of each of the measured parts 5, and each of the digital images is analyzed to obtain a width of each of the measured parts 5. The display device 3 displays the width of each of the measured parts 5. In one embodiment, the display device 3 may be a display screen of the computing device 1, or a monitor device connected with the computing device 1.

In the embodiment, the computing device 1 further includes a storage device 11 and a processor 12. The storage device 11 stores data related to the measured parts 5. The storage device 11 may be an internal storage system, such as a random access memory (RAM) for temporary storage of information, and/or a read only memory (ROM) for permanent storage of information. In some embodiments, the storage device 11 may also be an external storage system, such as an external hard disk, a storage card, or a data storage medium.

Figure 2:
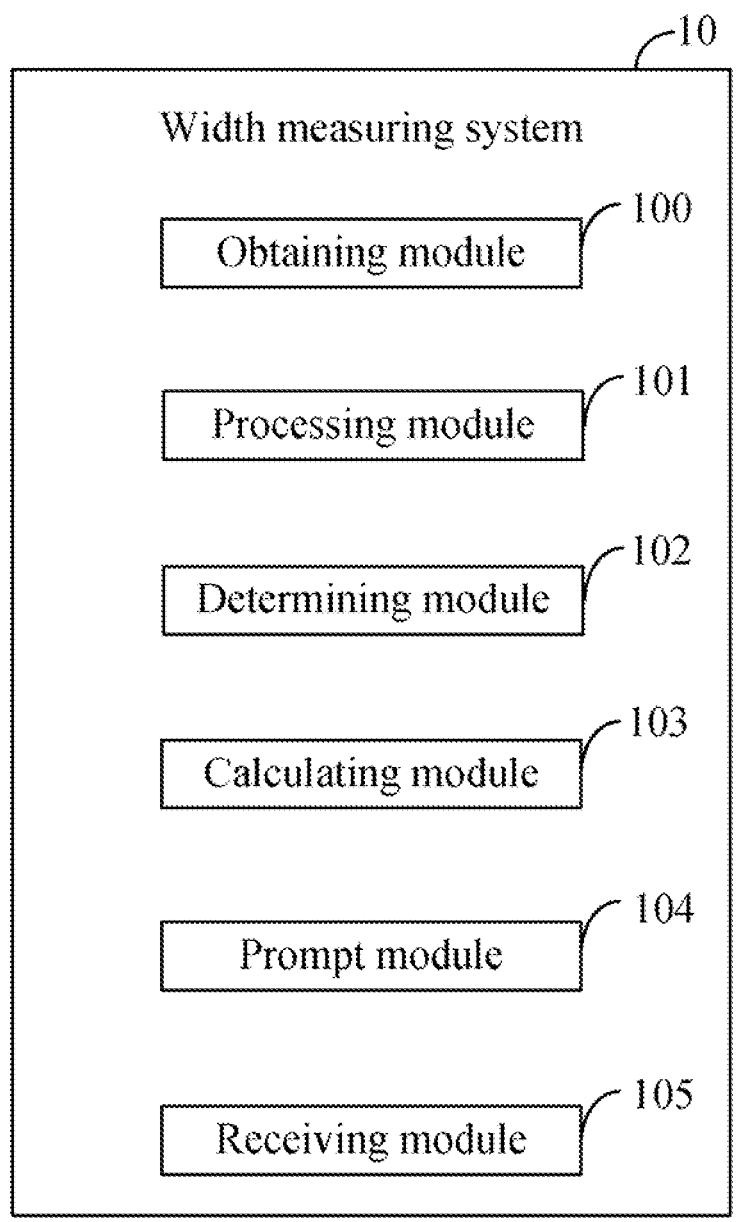
FIG. 2 is a block diagram of function modules of the width measuring system included in the computing device of FIG. 1.

FIG. 2 is a block diagram of function modules of the width measuring system 10 included in the computing device 1. In one embodiment, the width measuring system 10 may include one or more modules, for example, an obtaining module 100, a processing module 101, a determining module 102, a calculating module 103, a prompt module 104, and a receiving module 105. The one or more modules 100-105 may comprise computerized codes in the form of one or more programs that are stored in the storage device 11 of the computing device 1. The computerized codes may include instructions that are executed by the at least one processor 12 to provide functions for the one or more modules 100-105. A detailed description of each module will be given in the following paragraphs.

Figure 3:
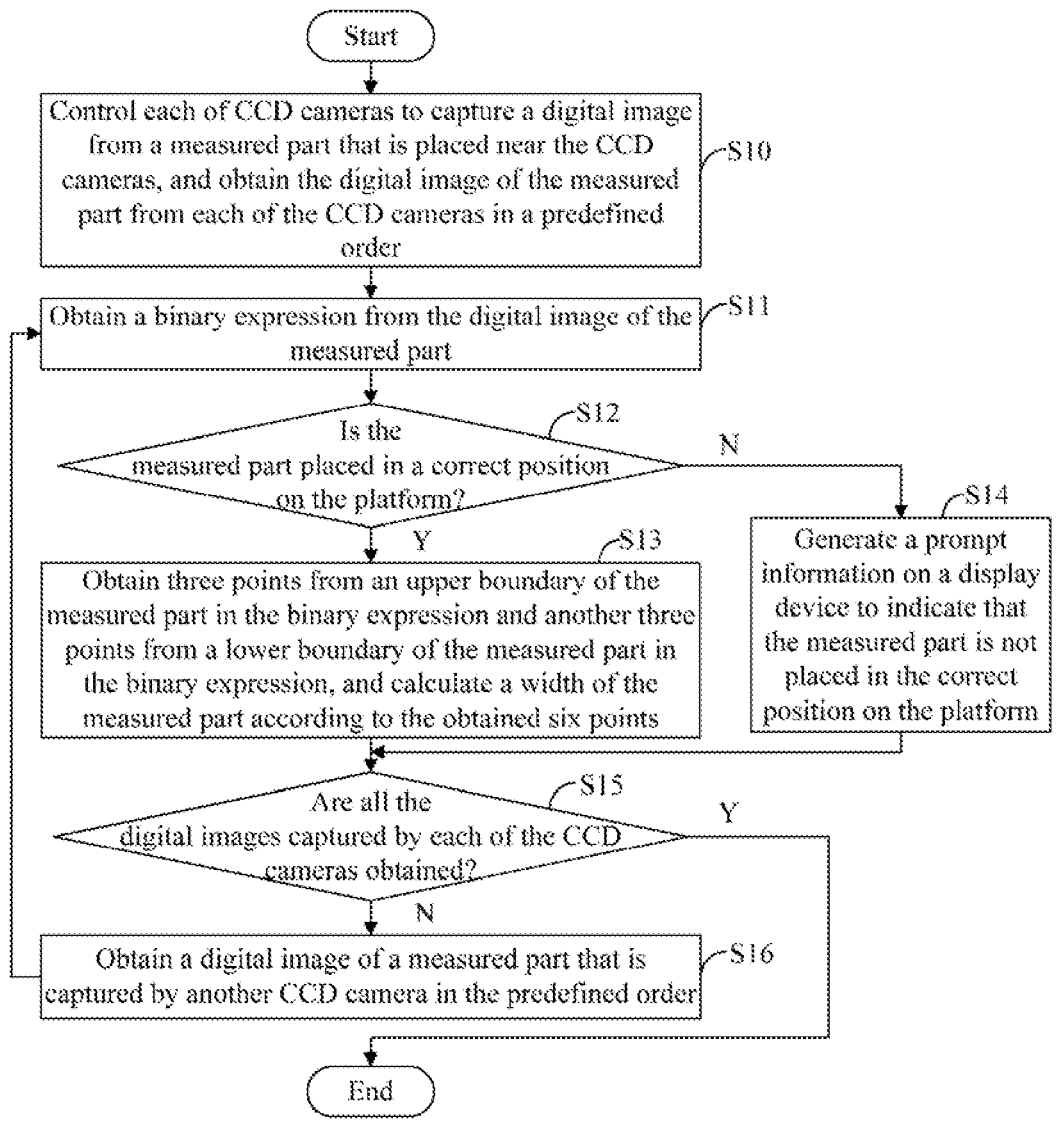
FIG. 3 is a flowchart of one embodiment of a method for automatically measuring widths of measured parts using the computing device of the FIG. 1.

FIG. 3 is a flowchart of one embodiment of a method for automatically measuring widths of the measured parts 5 using the computing device 1. Depending on the embodiment, additional steps may be added, others removed, and the ordering of the steps may be changed.

In step S10, the obtaining module 100 controls each of the CCD cameras 2 to capture a digital image from a measured part 5 of the object 4 that is placed near the CCD cameras 2, and obtains the digital image of the measured part 5 from each of the CCD cameras 2 in a predefined order. In one embodiment, the predefined order may be a sequence order that each of the CCD cameras 2 captures the digital image from each of the measured parts 5, or a reverse order that each of the CCD cameras 2 captures the digital image from each of the measured parts 5, for example. Referring to FIG. 1, the obtaining module 100 obtains the digital image of the measured part 5 captured by the CCD camera 2 on a left hand side of the measured part 5 first, and then obtains the digital image of the measured part 5 captured by the CCD camera 2 on a right hand side of the measured part 5, for example.

In step S11, the processing module 101 obtains a binary expression from the digital image of the measured part 5 by performing a binary processing method on the digital image, where the binary expression is an image that only has white color and black color. In one embodiment, the processing module 101 sets a predefined value, and assigns each pixel in the digital image of the measured part 5 into one of two classes, such as a first class and a second class. If an individual pixel value in the digital image of the measured part 5 is less than the predefined value, the processing module 101 assigns the pixel to the first class. The pixels in the first class are included on the basis of being a predefined color, where the predefined color can be either black or white. If an individual pixel value in the digital image of the measured part 5 is equal to or greater than the predefined value, the processing module 101 assigns the pixel to the second class, the pixels in the second class also have a predefined color which is the reverse of the color of the pixels in the first class (predefined reverse color). If the predefined color is black, the predefined reverse color is white. If the predefined color is white, the predefined reverse color is black.

In step S12, the determining module 102 determines whether the measured part 5 is placed in a correct position on the platform 6 according to the binary expression. If the measured part 5 is placed in the correct position on the platform 6, step S13 is implemented. If the measured part 5 is not placed in the correct position on the platform 6, step S14 is implemented. A detailed description of step S12 will be given in FIG. 4.

In step S13, the calculating module 103 obtains three points from an upper boundary of the measured part 5 in the binary expression and another three points from a lower boundary of the measured part 5 in the binary expression (as hereinafter explained), and calculates a width of the measured part 5 according to the obtained six points.

Before the width measuring system 10 measures the measured part 5 of the object 4, four predefined points can be selected (e.g., user-selected) from a pre-stored standard image of the measured part 5. The standard image is a digital image captured from the measured part 5 by the CCD camera 2 when the measured part 5 is placed in a standard position. The standard position is a position that the measured part 5 is at a right angle to the CCD camera 2, and the measured part 5 is within the lens field of the CCD camera 2. The four predefined points are a point in the left of an upper boundary of the measured part 5 in the standard image (hereinafter referred to as "left upper point"), a point in the right of the upper boundary of the measured part 5 in the standard image (hereinafter referred to as "right upper point"), a point in the left of a lower boundary of the measured part 5 in the standard image (hereinafter referred to as "left lower point"), and a point in the right of the lower boundary of the measured part 5 in the standard image (hereinafter referred to as "right lower point"). The left upper point is on a same x-coordinate as the left lower point, and the right upper point is on a same x-coordinate as the right lower point.

The calculating module 103 obtains two points from the upper boundary of the measured part 5 in the binary expression and another two points from the lower boundary of the measured part 5 in the binary expression according to the four predefined points. The calculating module 103 further obtains a midline segment according to the four predefined points, and obtains one point from the upper boundary of the measured part 5 in the binary expression and another point from the lower boundary of the measured part 5 in the binary expression according to the midline segment.

Figure 5:
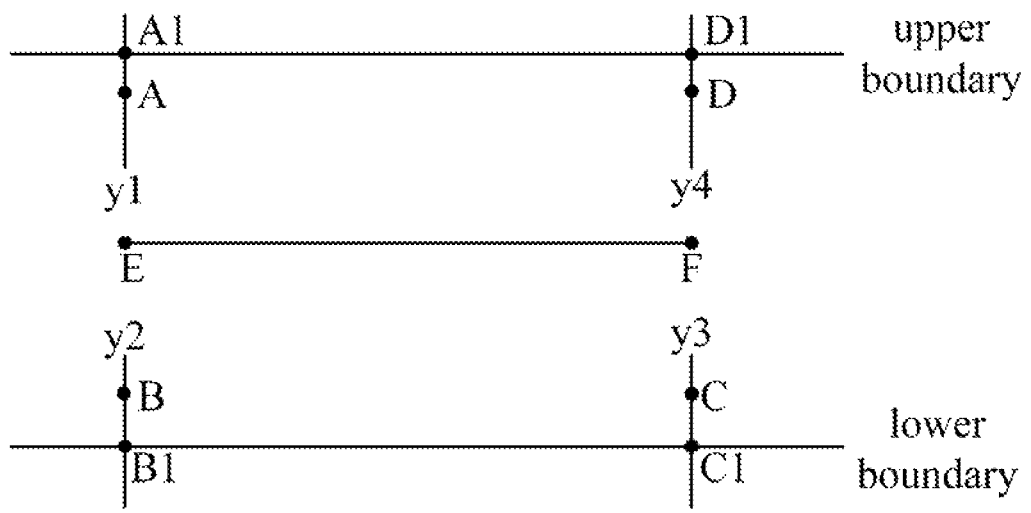
FIG. 5 is a schematic diagram illustrating a method to obtain four points according to four predefined points.

In some embodiments, the calculating module 103 obtains four y-axes of the four predefined points based on an X-Y coordinate system. The four y-axes are a y-axis of the left upper point, a y-axis of the right upper point, a y-axis of the left lower point, and a y-axis of the right lower point. The y-axis of the left upper point and the y-axis of the right upper point intersect with the upper boundary of the measured part 5 in the binary expression to obtain two points from the upper boundary of the measured part 5 in the binary expression. The y-axis of the left lower point and the y-axis of the right lower point intersect with the lower boundary of the measured part 5 in the binary expression to obtain another two points from the lower boundary of the measured part 5 in the binary expression. Referring to FIG. 5, the four predefined points are points A, B, C, and D, and the four y-axes are y1-axis, y2-axis, y3-axis, and y4-axis. The y1-axis and y4-axis intersect with the upper boundary of the measured part 5 in the binary expression to obtain point A1 and point D1. The y2-axis and y3-axis intersect with the lower boundary of the measured part 5 in the binary expression to obtain point B1 and point C1.

In some embodiments, the left upper point and the left lower point constitute a line segment on the left of the standard image, and the calculating module 103 obtains a midpoint of the line segment on the left of the standard image (hereinafter referred to as "left midpoint"). The right upper point and the right lower point constitute a line segment on the right of the standard image, and the calculating module 103 obtains a midpoint of the line segment on the right of the standard image (hereinafter referred to as "right midpoint"). The left midpoint and the right midpoint then constitute the midline segment. Referring to FIG. 5, the left midpoint is point E, the right midpoint is point F, and the midline segment is segment EF. The calculating module 103 obtains a midpoint of the midline segment, and obtains a y-axis of the midpoint. The y-axis of the midpoint intersects with the upper boundary of the measured part 5 in the binary expression to obtain one point; and intersects with the lower boundary of the measured part 5 in the binary expression to obtain another point.

Specifically, the obtained six points are points that the calculating module 103 obtains from the upper boundary of the measured part 5 in the binary expression and the lower boundary of the measured part 5 in the binary expression. The obtained six points are the points where the y-axis of the left upper point intersects with the upper boundary of the measured part 5 in the binary expression (hereinafter referred to as "upper left point"), a point where the y-axis of the left lower point intersects with the lower boundary of the measured part 5 in the binary expression (hereinafter referred to as "lower left point"), a point where the y-axis of the right upper point intersects with the upper boundary of the measured part 5 in the binary expression (hereinafter referred to as "upper right point"), a point where the y-axis of the right lower point intersects with the lower boundary of the measured part 5 in the binary expression (hereinafter referred to as "lower right point"), a point where the y-axis of the midpoint intersects with the upper boundary of the measured part 5 in the binary expression (hereinafter referred to as "upper midpoint"), and a point where the y-axis of the midpoint intersects with the lower boundary of the measured part 5 in the binary expression (hereinafter referred to as "lower midpoint"). The calculating module 103 calculates a left distance between the upper left point and the lower left point, a right distance between the upper right point and the lower right point, and a middle distance between the upper midpoint and the lower midpoint. The calculating module 103 further calculates an average distance of the left distance, the right distance, and the middle distance, where the average distance is the width of the measured part 5.

In step S14, the prompt module 104 generates a prompt information on the display device 3 to indicate that the measured part 5 is not placed in the correct position on the platform 6. The prompt information may include a current position of the measured part 5 and an indication as to what would be the correct position of the measured part 5.

In step S15, the determining module 102 determines whether all the digital images captured by each of the CCD cameras 2 are obtained. If all the digital images captured by each of the CCD cameras 2 are not all obtained, step S16 is implemented. If all the digital images captured by each of the CCD cameras 2 are obtained, the procedure ends.

In step S16, the obtaining module 100 obtains a digital image of a measured part 5 that is captured by another CCD camera 2 in the predefined order, and step S11 is repeated.

Figure 4:
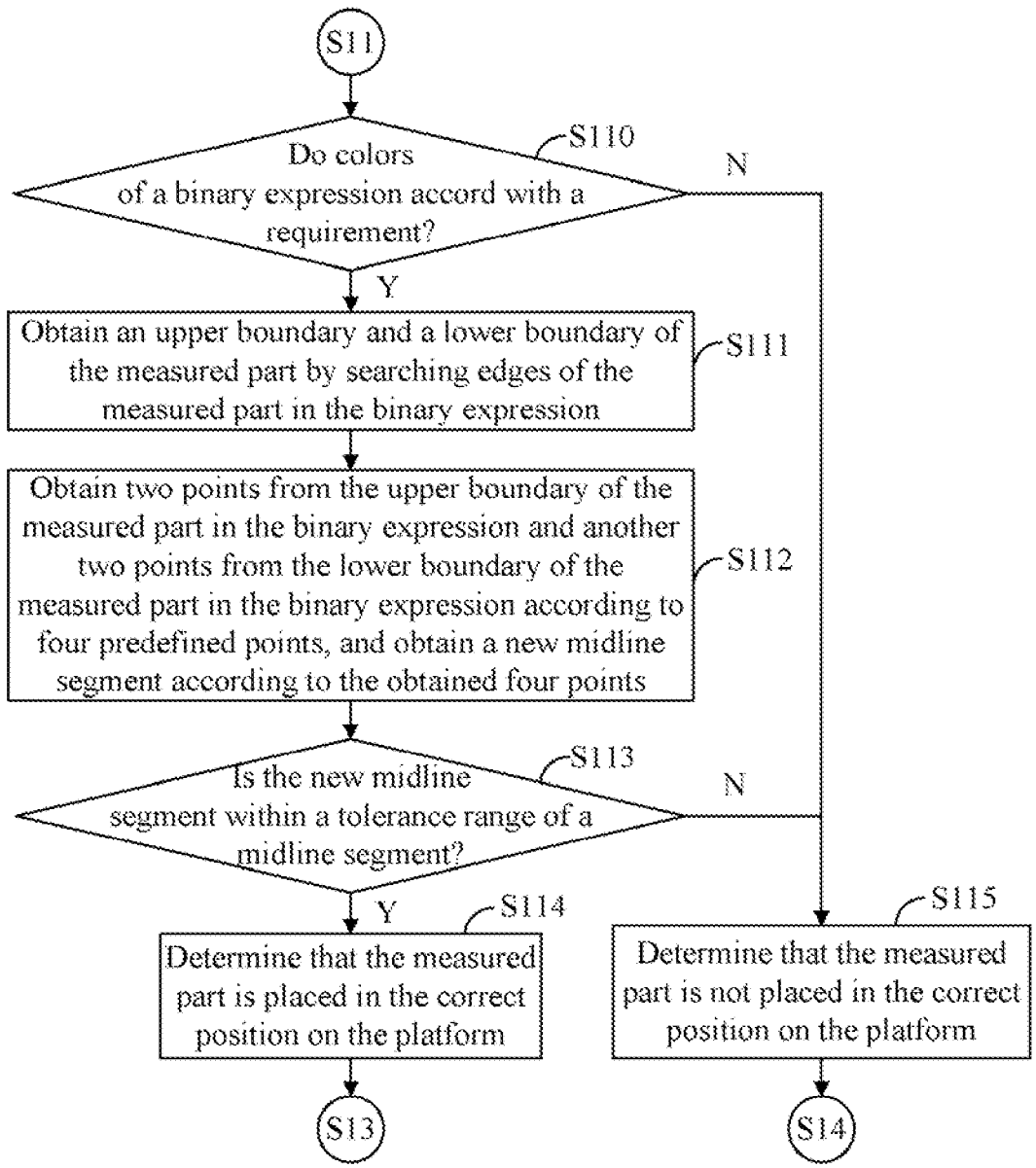
FIG. 4 is a detailed flowchart of step S12 in FIG. 3.

FIG. 4 is a detailed flowchart of step S12 in FIG. 3. Depending on the embodiment, additional steps may be added, others removed, and the ordering of the steps may be changed.

In step S110, the determining module 102 determines whether the colors of the binary expression accord with a requirement. If the colors of the binary expression accord with the requirement, step S111 is implemented. If the colors of the binary expression do not accord with the requirement, step S115 is implemented. The requirement can be user-selected or pre-determined. The requirement is that the colors of the binary expression include black, white, and black from top to bottom (depending on the respective contents of the first and second classes), or white, black, and white from top to bottom.

In step S111, the determining module 102 obtains the upper boundary and the lower boundary of the measured part 5 by searching edges of the measured part 5 in the binary expression.

In step S112, the determining module 102 obtains two points from the upper boundary of the measured part 5 in the binary expression and another two points from the lower boundary of the measured part 5 in the binary expression according to the four predefined points, and obtains a new midline segment according to the obtained four points. In one embodiment, the method for obtaining the new midline segment is the same as the method for obtaining the previous midline segment.

In step S113, the determining module 102 determines whether the new midline segment is within a tolerance range of the midline segment. If the new midline segment is within the tolerance range of the midline segment, step S114 is implemented. If the new midline segment is not within the tolerance range of the midline segment, step S115 is implemented. The tolerance range is an acute angle constituted by the new midline segment and the midline segment. For example, the tolerance range is an angle between 0 and 15 degrees.

In step S114, the determining module 102 determines that the measured part 5 is placed in the correct position on the platform 6.

In step S115, the determining module 102 determines that the measured part 5 is not placed in the correct position on the platform 6.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computerized-implemented method of a computing device for measuring widths of measured parts placed on a platform, the computing device electronically connected to one or more charge coupled device (CCD) cameras, the method comprising:
    (a) controlling each of the CCD cameras to capture a digital image from a measured part that is placed near the CCD cameras, and obtaining the digital image of the measured part from each of the CCD cameras in a predefined order;
    (b) obtaining a binary expression from the digital image of the measured part;
    (c) determining whether the measured part is placed in a correct position on the platform according to the binary expression, the determination comprising:
        determining whether colors of the binary expression accord with a requirement;
        obtaining the upper boundary and the lower boundary of the measured part by searching edges of the measured part in the binary expression when the colors of the binary expression accord with the requirement;
        obtaining two points from the upper boundary of the measured part in the binary expression and another two points from the lower boundary of the measured part in the binary expression according to four predefined points, and obtaining a new midline segment according to the obtained four points, wherein the four predefined points are selected by a user in a standard image that is captured by a CCD camera when the measured part is at a right angle to the CCD camera, and the measured part is within a lens field of the CCD camera;
        determining whether the new midline segment is within a tolerance range of a midline segment of the four predefined points;
        determining that the measured part is placed in the correct position on the platform when the new midline segment is within the tolerance range of the midline segment of the four predefined points; and
        determining that the measured part is not placed in the correct position on the platform when the colors of the binary expression do not accord with the requirement, or when the new midline segment is not within the tolerance range of the midline segment of the four predefined points;
    (d) obtaining three points from an upper boundary of the measured part in the binary expression and another three points from a lower boundary of the measured part in the binary expression when the measured part is placed in the correct position on the platform; and
    (e) calculating a width of the measured part according to the obtained three points from the upper boundary of the measured part and the obtained three pointed from the lower boundary of the measured part.

2. The method according to claim 1, wherein the four predefined points are a left upper point in the left of an upper boundary of the measured part in the standard image, a right upper point in the right of the upper boundary of the measured part in the standard image, a left lower point in the left of a lower boundary of the measured part in the standard image, and a right lower point in the right of the lower boundary of the measured part in the standard image, wherein the left upper point is on a same x-coordinate as the left lower point, the right upper point is on a same x-coordinate as the right lower point.

3. The method according to claim 2, wherein the obtained four points are obtained by:

intersecting a y-axis of the left upper point and a y-axis of the right upper point with the upper boundary of the measured part in the binary expression to obtain two points; and intersecting a y-axis of the left lower point and a y-axis of the right lower point with the lower boundary of the measured part in the binary expression to obtain another two points.

4. The method according to claim 2, wherein (e) comprises:

obtaining a midline segment according to the four predefined points, obtaining one point from the upper boundary of the measured part in the binary expression and another point from the lower boundary of the measured part in the binary expression according to the midline segment, and calculating a middle distance between the obtained two points;

calculating a left distance between an upper left point and a lower left point, wherein the upper left point is a point that the y-axis of the left upper point intersects with the upper boundary of the measured part in the binary expression, and the lower left point is a point that the y-axis of the left lower point intersects with the lower boundary of the measured part in the binary expression;

calculating a right distance between an upper right point and a lower right point, wherein the upper right point is a point that the y-axis of the right upper point intersects with the upper boundary of the measured part in the binary expression, and the lower right point is a point that the y-axis of the right lower point intersects with the lower boundary of the measured part in the binary expression; and calculating an average distance of the left distance, the right distance, and the middle distance, wherein the average distance is the width of the measured part.

5. The method according to claim 4, wherein the new midline segment is obtained by:

obtaining a new left midpoint of a left line segment, wherein the left line segment is a line segment on the left of the binary expression constituted by the upper left point and the lower left point;

obtaining a new right midpoint of a right line segment, wherein the right line segment is a line segment on the right of the binary expression constituted by the upper right point and the lower right point; and obtaining the new midline segment constituted by the new left midpoint and the new right midpoint.

6. A computing device for measuring widths of measured parts, the computing device being connected to one or more charge coupled device (CCD) cameras, and comprising:

at least one processor; and a storage device storing one or more programs which when executed by the at least one processor, cause the at least one processor to perform operations comprising:

(a) controlling each of the CCD cameras to capture a digital image from a measured part that is placed near the CCD cameras, and obtaining the digital image of the measured part from each of the CCD cameras in a predefined order, wherein the measured part is placed on a platform;

(b) obtaining a binary expression from the digital image of the measured part;

(c) determining whether the measured part is placed in a correct position on the platform according to the binary expression, the determination comprising:

determining whether colors of the binary expression accord with a requirement;

obtaining the upper boundary and the lower boundary of the measured part by searching edges of the measured part in the binary expression when the colors of the binary expression accord with the requirement;

obtaining two points from the upper boundary of the measured part in the binary expression and another two points from the lower boundary of the measured part in the binary expression according to four predefined points, and obtaining a new midline segment according to the obtained four points, wherein the four predefined points are selected by a user in a standard image that is captured by a CCD camera when the measured part is at a right angle to the CCD camera, and the measured part is within a lens field of the CCD camera;

determining whether the new midline segment is within a tolerance range of a midline segment of the four predefined points;

determining that the measured part is placed in the correct position on the platform when the new midline segment is within the tolerance range of the midline segment of the four predefined points; and determining that the measured part is not placed in the correct position on the platform when the colors of the binary expression do not accord with the requirement, or when the new midline segment is not within the tolerance range of the midline segment of the four predefined points;

(d) obtaining three points from an upper boundary of the measured part in the binary expression and another three points from a lower boundary of the measured part in the binary expression when the measured part is placed in the correct position on the platform; and (e) calculating a width of the measured part according to the obtained three points from the upper boundary of the measured part and the obtained three pointed from the lower boundary of the measured part.

7. The computing device according to claim 6, wherein the four predefined points are a left upper point in the left of an upper boundary of the measured part in the standard image, a right upper point in the right of the upper boundary of the measured part in the standard image, a left lower point in the left of a lower boundary of the measured part in the standard image, and a right lower point in the right of the lower boundary of the measured part in the standard image, wherein the left upper point is on a same x-coordinate as the left lower point, the right upper point is on a same x-coordinate as the right lower point.

8. The computing device according to claim 7, wherein the obtained four points are obtained by:

intersecting a y-axis of the left upper point and a y-axis of the right upper point with the upper boundary of the measured part in the binary expression to obtain two points; and intersecting a y-axis of the left lower point and a y-axis of the right lower point with the lower boundary of the measured part in the binary expression to obtain another two points.

9. The computing device according to claim 7, wherein (e) comprises:

obtaining a midline segment according to the four predefined points, obtaining one point from the upper boundary of the measured part in the binary expression and another point from the lower boundary of the measured part in the binary expression according to the midline segment, and calculating a middle distance between the obtained two points;

calculating a left distance between an upper left point and a lower left point, wherein the upper left point is a point that the y-axis of the left upper point intersects with the upper boundary of the measured part in the binary expression, and the lower left point is a point that the y-axis of the left lower point intersects with the lower boundary of the measured part in the binary expression;
calculating a right distance between an upper right point and a lower right point, wherein the upper right point is a point that the y-axis of the right upper point intersects with the upper boundary of the measured part in the binary expression, and the lower right point is a point that the y-axis of the right lower point intersects with the lower boundary of the measured part in the binary expression; and
calculating an average distance of the left distance, the right distance, and the middle distance, wherein the average distance is the width of the measured part.

10. The computing device according to claim 9, wherein the new midline segment is obtained by:
obtaining a new left midpoint of a left line segment, wherein the left line segment is a line segment on the left of the binary expression constituted by the upper left point and the lower left point;
obtaining a new right midpoint of a right line segment, wherein the right line segment is a line segment on the right of the binary expression constituted by the upper right point and the lower right point; and
obtaining the new midline segment constituted by the new left midpoint and the new right midpoint.

11. A non-transitory storage medium having stored thereon instructions that, when executed by a processor of a computing device for measuring widths of measured parts placed on a platform, causes the computing device to perform a method, the computing device electronically connected to one or more charge coupled device (CCD) cameras, the method comprising:
(a) controlling each of the CCD cameras to capture a digital image from a measured part that is placed near the CCD cameras, and obtaining the digital image of the measured part from each of the CCD cameras in a predefined order;
(b) obtaining a binary expression from the digital image of the measured part;
(c) determining whether the measured part is placed in a correct position on the platform according to the binary expression, the determination comprising:
determining whether colors of the binary expression accord with a requirement;
obtaining the upper boundary and the lower boundary of the measured part by searching edges of the measured part in the binary expression when the colors of the binary expression accord with the requirement;
obtaining two points from the upper boundary of the measured part in the binary expression and another two points from the lower boundary of the measured part in the binary expression according to four predefined points, and obtaining a new midline segment according to the obtained four points, wherein the four predefined points are selected by a user in a standard image that is captured by a CCD camera when the measured part is at a right angle to the CCD camera, and the measured part is within a lens field of the CCD camera;
determining whether the new midline segment is within a tolerance range of a midline segment of the four predefined points;
determining that the measured part is placed in the correct position on the platform when the new midline segment is within the tolerance range of the midline segment of the four predefined points; and
determining that the measured part is not placed in the correct position on the platform when the colors of the binary expression do not accord with the requirement, or when the new midline segment is not within the tolerance range of the midline segment of the four predefined points;
(d) obtaining three points from an upper boundary of the measured part in the binary expression and another three points from a lower boundary of the measured part in the binary expression when the measured part is placed in the correct position on the platform; and
(e) calculating a width of the measured part according to the obtained three points from the upper boundary of the measured part and the obtained three pointed from the lower boundary of the measured part.

12. The non-transitory storage medium according to claim 11, wherein the four predefined points are a left upper point in the left of an upper boundary of the measured part in the standard image, a right upper point in the right of the upper boundary of the measured part in the standard image, a left lower point in the left of a lower boundary of the measured part in the standard image, and a right lower point in the right of the lower boundary of the measured part in the standard image, wherein the left upper point is on a same x-coordinate as the left lower point, the right upper point is on a same x-coordinate as the right lower point.

13. The non-transitory storage medium according to claim 12, wherein the obtained four points are obtained by:
intersecting a y-axis of the left upper point and a y-axis of the right upper point with the upper boundary of the measured part in the binary expression to obtain two points; and
intersecting a y-axis of the left lower point and a y-axis of the right lower point with the lower boundary of the measured part in the binary expression to obtain another two points.

14. The non-transitory storage medium according to claim 12, wherein (e) comprises:
obtaining a midline segment according to the four predefined points, obtaining one point from the upper boundary of the measured part in the binary expression and another point from the lower boundary of the measured part in the binary expression according to the midline segment, and calculating a middle distance between the obtained two points;
calculating a left distance between an upper left point and a lower left point, wherein the upper left point is a point that the y-axis of the left upper point intersects with the upper boundary of the measured part in the binary expression, and the lower left point is a point that the y-axis of the left lower point intersects with the lower boundary of the measured part in the binary expression;
calculating a right distance between an upper right point and a lower right point, wherein the upper right point is a point that the y-axis of the right upper point intersects with the upper boundary of the measured part in the binary expression, and the lower right point is a point that the y-axis of the right lower point intersects with the lower boundary of the measured part in the binary expression; and
calculating an average distance of the left distance, the right distance, and the middle distance, wherein the average distance is the width of the measured part.

15. The non-transitory storage medium according to claim 14, wherein the new midline segment is obtained by:

obtaining a new left midpoint of a left line segment, wherein the left line segment is a line segment on the left of the binary expression constituted by the upper left point and the lower left point;

obtaining a new right midpoint of a right line segment, wherein the right line segment is a line segment on the right of the binary expression constituted by the upper right point and the lower right point; and obtaining the new midline segment constituted by the new left midpoint and the new right midpoint.

* * * * *